US012768791B2

(12) United States Patent
Shibutani et al.

(10) Patent No.: US 12,768,791 B2
(45) Date of Patent: Oct. 20, 2026

(54) OPTICAL AXIS ADJUSTMENT METHOD FOR LASER MODULE AND OPTICAL AXIS ADJUSTMENT JIG

(71) Applicant: SHIMADZU CORPORATION, Kyoto (JP)

(72) Inventors: Ryuta Shibutani, Kyoto (JP); Tomoyo Tao, Kyoto (JP)

(73) Assignee: SHIMADZU CORPORATION, Kyoto (JP)

(*) Notice: Subject to any disclaimer, the term of this patent is extended or adjusted under 35 U.S.C. 154(b) by 303 days.

(21) Appl. No.: 18/687,346

(22) PCT Filed: Aug. 30, 2022

(86) PCT No.: PCT/JP2022/032548
§ 371 (c)(1),
(2) Date: Sep. 30, 2024

(87) PCT Pub. No.: WO2023/032963
PCT Pub. Date: Mar. 9, 2023

(65) Prior Publication Data

US 2025/0012727 A1 Jan. 9, 2025

(30) Foreign Application Priority Data

Aug. 31, 2021 (JP) ................................ 2021-141407
Aug. 30, 2022 (JP) ................................ 2022-136549

(51) Int. Cl.
*G01N 21/65* (2006.01)

(52) U.S. Cl.
CPC ... *G01N 21/65* (2013.01); *G01N 2201/06113* (2013.01)

(58) Field of Classification Search
CPC .................... G01N 21/65; G01N 2201/06113
See application file for complete search history.

(56) References Cited

U.S. PATENT DOCUMENTS

2003/0128728 A1* 7/2003 Shimizu ................ B82Y 20/00 372/36
2020/0064187 A1 2/2020 Ishimitsu

FOREIGN PATENT DOCUMENTS

CN 112880979 A 6/2021
CN 213857675 U 8/2021
JP 02-89662 A 3/1990

(Continued)

OTHER PUBLICATIONS

Japanese Office Action dated Mar. 11, 2025 in Application No. 2023-545592.

(Continued)

*Primary Examiner* — Kevin K Pyo
(74) *Attorney, Agent, or Firm* — Sughrue Mion, PLLC

(57) ABSTRACT

In a jig mounting step (Step S1), a laser module having an optical axis adjustment mechanism is mounted on an optical axis adjustment jig in a state where the laser module is detached from a Raman spectrometer. In an optical axis adjusting step (Step S2), an optical axis of a laser module mounted on the optical axis adjustment jig is adjusted using the optical axis adjustment mechanism of the laser module. In a device attaching step (Step S4), a laser module whose optical axis has been adjusted by the optical axis adjusting step is attached to an attachment position of a Raman spectrometer.

4 Claims, 9 Drawing Sheets

(56) References Cited

FOREIGN PATENT DOCUMENTS

| | | | |
|---|---|---|---|
| JP | 10-90064 | A | 4/1998 |
| JP | 2010-085374 | A | 4/2010 |
| JP | 2011-230179 | A | 11/2011 |
| JP | 2013-186393 | A | 9/2013 |

OTHER PUBLICATIONS

International Search Report for PCT/JP2022/032548 dated Nov. 8, 2022 (PCT/ISA/210).

Written Opinion for PCT/JP2022/032548 dated Nov. 8, 2022 (PCT/ISA/237).

Extended European Search Report dated Jul. 29, 2025 from the European Patent Office in Application No. 22864545.3.

Communication dated Oct. 1, 2024, issued in Japanese Application No. 2023-545592.

* cited by examiner

OPTICAL AXIS ADJUSTMENT METHOD FOR LASER MODULE AND OPTICAL AXIS ADJUSTMENT JIG

CROSS REFERENCE TO RELATED APPLICATIONS

This application is a National Stage of International Application No. PCT/JP2022/032548 filed Aug. 30, 2022, claiming priority based on Japanese Patent Application No. 2021-141407 filed Aug. 31, 2021 and Japanese Patent Application No. 2022-136549 filed Aug. 30, 2022.

TECHNICAL FIELD

The present invention relates to an optical axis adjustment method for a laser module and an optical axis adjustment jig.

BACKGROUND ART

A Raman spectrometer includes a laser light source that emits laser light as excitation light (see, for example, Patent Document 1 below). A sample is irradiated with laser light emitted from a laser light source, and Raman scattered light is emitted from the sample excited by the laser light. This Raman scattered light is spectrally dispersed by a spectroscope, and intensity of the Raman scattered light for each wavelength is detected by a detector.

PRIOR ART DOCUMENT

Patent Document

Patent Document 1: JP H10-90064 A

SUMMARY OF THE INVENTION

Problems to be Solved by the Invention

In a Raman spectrometer, a plurality of optical members such as a mirror and a lens are arranged on an optical path of laser light from a laser light source to a sample and an optical path of Raman scattered light from a sample to a detector. Therefore, in a case where an optical axis of laser light emitted from a laser light source is displaced, it is necessary to perform optical axis adjustment for laser light by adjusting a position, an angle, or the like of a plurality of optical members.

Since a laser light source has a lifetime, there is a case where a laser light source is detached from a Raman spectrometer and replaced. In this case, since an optical axis of laser light is displaced due to replacement of the laser light source, it is necessary to perform optical axis adjustment for laser light, but work of adjusting a position, an angle, or the like of a plurality of optical members needs to be performed on site.

In a case where the above work is performed on site where a Raman spectrometer is installed, it takes time to perform the work, and the Raman spectrometer cannot be used during the work. Further, there may be restriction on work on site, for example, optical axis adjustment for laser light needs to be performed in a laser management area.

The present invention has been made in view of the above circumstances, and an object of the present invention is to provide an optical axis adjustment method for a laser module and an optical axis adjustment jig that do not require optical axis adjustment for laser light in a Raman spectrometer.

Means for Solving the Problems

A first aspect of the present invention is an optical axis adjustment method for a laser module used in a Raman spectrometer, the optical axis adjustment method including a jig mounting step, an optical axis adjusting step, and a device attaching step. In the jig mounting step, the laser module having an optical axis adjustment mechanism is mounted on an optical axis adjustment jig in a state where the laser module is detached from the Raman spectrometer. In the optical axis adjusting step, an optical axis of the laser module mounted on the optical axis adjustment jig is adjusted using the optical axis adjustment mechanism of the laser module. In the device attaching step, the laser module whose optical axis has been adjusted by the optical axis adjusting step is attached to an attachment position of the Raman spectrometer.

A second aspect of the present invention is an optical axis adjustment jig used in the optical axis adjustment method for a laser module, the optical axis adjustment jig including an attachment member on which the laser module is mounted, and an irradiation unit that is irradiated with laser light from the laser module mounted on the attachment member.

Effects of the Invention

According to the present invention, it is possible to provide an optical axis adjustment method for a laser module and an optical axis adjustment jig that do not require optical axis adjustment for laser light in a Raman spectrometer.

MODE FOR CARRYING OUT THE INVENTION

1. Configuration of Raman Spectrometer

Figure 1:
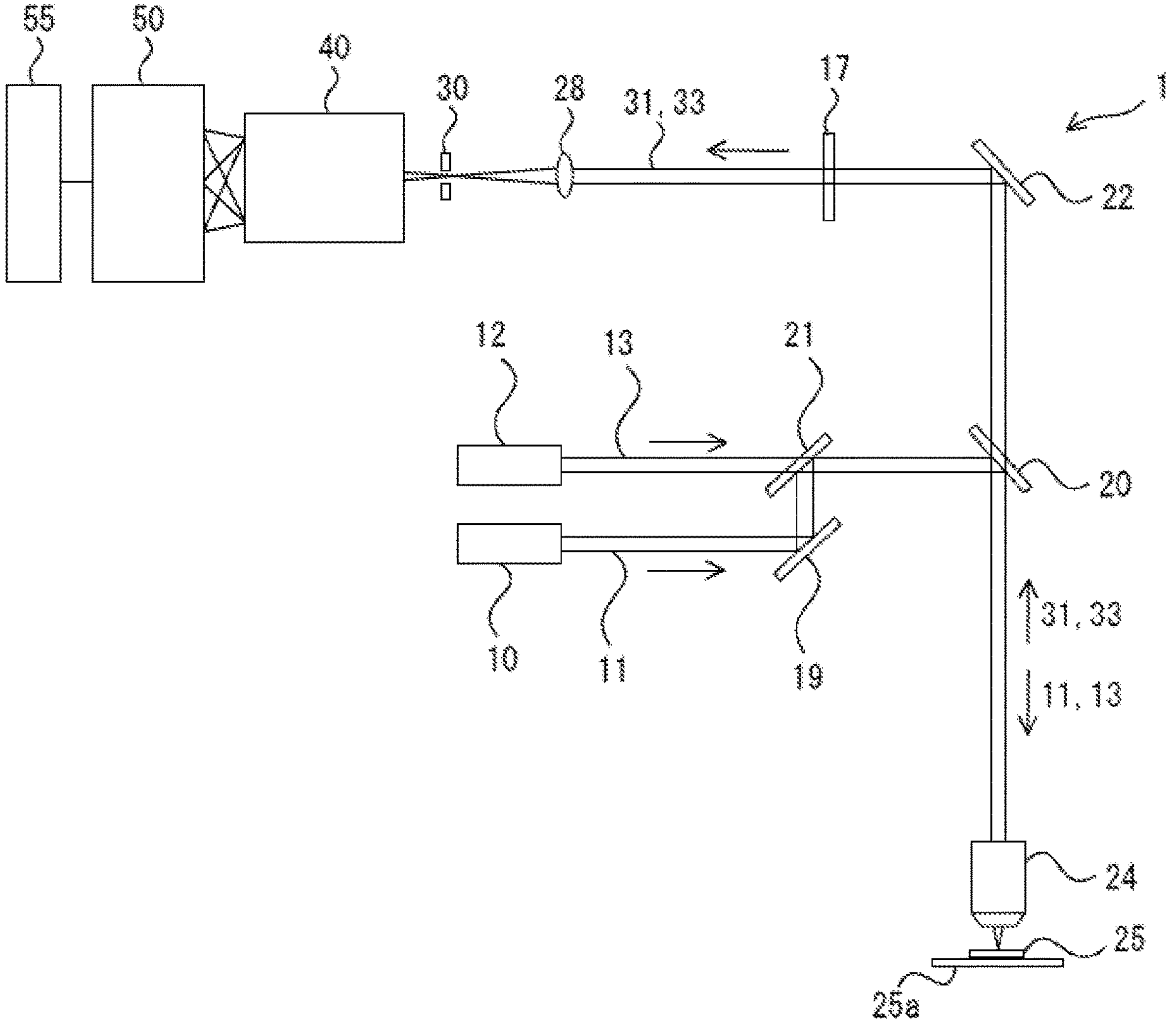
FIG. 1 is a schematic diagram illustrating a configuration example of a Raman spectrometer.

FIG. 1 is a schematic diagram illustrating a configuration example of a Raman spectrometer 1. Hereinafter, a specific configuration of the Raman spectrometer 1 will be described, but the present invention is not limited to this configuration, and at least a part members may be omitted, or another member may be included.

The Raman spectrometer 1 includes, for example, a first laser light source 10, a second laser light source 12, a sample support portion 25*a*, a spectroscopic optical system 40, a photodetector 50, a signal processor 55, a plurality of mirrors 19, 21, and 22, a long pass filter 17, a beam splitter 20, an objective lens 24, a condenser lens 28, a slit 30, and the like.

Each of the above-described members included in the Raman spectrometer 1 is a member for irradiating a sample 25 with laser light and spectrally dispersing and detecting Raman scattered light emitted from the sample 25 excited by the laser light. Among these members, optical members such as the mirrors 19 and 22, the long pass filter 17, and the condenser lens 28 are fixed in the Raman spectrometer 1, and a mechanism that can adjust a position or an angle of these may not be provided. On the other hand, the mirror 21, the long pass filter 17, and the beam splitter 20 are switched between a case of using the first laser light source 10 and a case of using the second laser light source 12.

The first laser light source 10 emits first laser light 11. The second laser light source 12 emits second laser light 13 having a wavelength shorter than that of the first laser light 11. As described above, in the present embodiment, the sample 25 can be excited using two of the laser light sources 10 and 12 that emit the laser light 11 and 13 having different wavelengths. However, the number of laser light sources included in the Raman spectrometer 1 is not limited to two, and may be one or three or more.

The laser light source can include, for example, a solid-state laser of diode laser excitation, a helium neon laser, a titanium sapphire laser, or a laser oscillator such as a Nd:YAG laser. Further, in a case of a configuration in which laser light from a laser oscillator is guided by a light guide such as an optical fiber, an emission tube or the like provided at a tip of an optical fiber may constitute a laser light source.

The sample 25 is supported by the sample support portion 25*a* such as a sample stage. In the present embodiment, the sample 25 can be irradiated with either the first laser light 11 or the second laser light 13 according to the sample 25. First Raman scattered light 31 is emitted from the sample 25 excited by irradiation with the first laser light 11. On the other hand, second Raman scattered light 33 is emitted from the sample 25 excited by irradiation with the second laser light 13.

Since efficiency of Raman scattering is improved more as an excitation wavelength is shorter, it is preferable to irradiate the sample 25 with the second laser light 13 instead of the first laser light 11 in a case where intensity of Raman scattered light is made higher. On the other hand, in a case where fluorescence emitted from the sample 25 is too strong when the sample 25 is irradiated with the second laser light 13, the sample 25 is preferably irradiated with the first laser light 11 instead of the second laser light 13.

When the first laser light source 10 is used, the first laser light 11 emitted from the first laser light source 10 is reflected by the mirrors 19 and 21 and is incident on the beam splitter 20. In this case, the beam splitter 20 reflects the first laser light 11 and transmits the first Raman scattered light 31. Therefore, the first laser light 11 incident on the beam splitter 20 is reflected by the beam splitter 20, passes through the objective lens 24, and is applied to the sample 25.

When the second laser light source 12 is used, the mirror 21 and the beam splitter 20 are switched. The second laser light 13 emitted from the second laser light source 12 passes through the mirror 21 and is incident on the beam splitter 20. In this case, the beam splitter 20 reflects the second laser light 13 and transmits the second Raman scattered light 33. Therefore, the second laser light 13 incident on the beam splitter 20 is reflected by the beam splitter 20, passes through the objective lens 24, and is applied to the sample 25.

The first Raman scattered light 31 emitted from the sample 25 irradiated with the first laser light 11 has a longer wavelength than the first laser light 11. The first Raman scattered light 31 passes through the objective lens 24, is incident on the beam splitter 20, passes through the beam splitter 20, is reflected by the mirror 22, and then is incident on the long pass filter 17. When the first laser light source 10 is used, the first Raman scattered light 31 passes through the long pass filter 17, is condensed by the condenser lens 28, and then is incident on the spectroscopic optical system 40 through the slit 30.

The second Raman scattered light 33 emitted from the sample 25 irradiated with the second laser light 13 has a longer wavelength than the second laser light 13. Further, the second Raman scattered light 33 has a wavelength shorter than that of the first Raman scattered light 31. The second Raman scattered light 33 passes through the objective lens 24, is incident on the beam splitter 20, passes through the beam splitter 20, is reflected by the mirror 22, and then is incident on the long pass filter 17. When the second laser light source 12 is used, the second Raman scattered light 33 passes through the long pass filter 17, is condensed by the condenser lens 28, and then is incident on the spectroscopic optical system 40 through the slit 30.

The spectroscopic optical system 40 includes, for example, a collimator lens, a spectroscope, a condensing optical element, and the like (all not illustrated). The spectroscope includes a spectroscopic optical element such as a grating or a prism. The first Raman scattered light 31 and the second Raman scattered light 33 incident on the spectroscopic optical system 40 are spectrally dispersed by different spectroscopic optical elements, and the first Raman scattered light 31 and the second Raman scattered light 33 separated for each wavelength are condensed by the condensing optical element and incident on the photodetector 50.

Examples of the photodetector 50 include a charge coupled device (CCD) detector. The photodetector 50 includes a plurality of light detection elements, and outputs a signal corresponding to received light intensity of the first Raman scattered light 31 or the second Raman scattered light 33 in each light detection element. An electrical signal output from the photodetector 50 is processed by the signal processor 55 electrically connected to the photodetector 50. The signal processor 55 includes, for example, a central processing unit (CPU), a random access memory (RAM), a read only memory (ROM), and the like.

2 Configuration Around Laser Light Source

Figure 2:
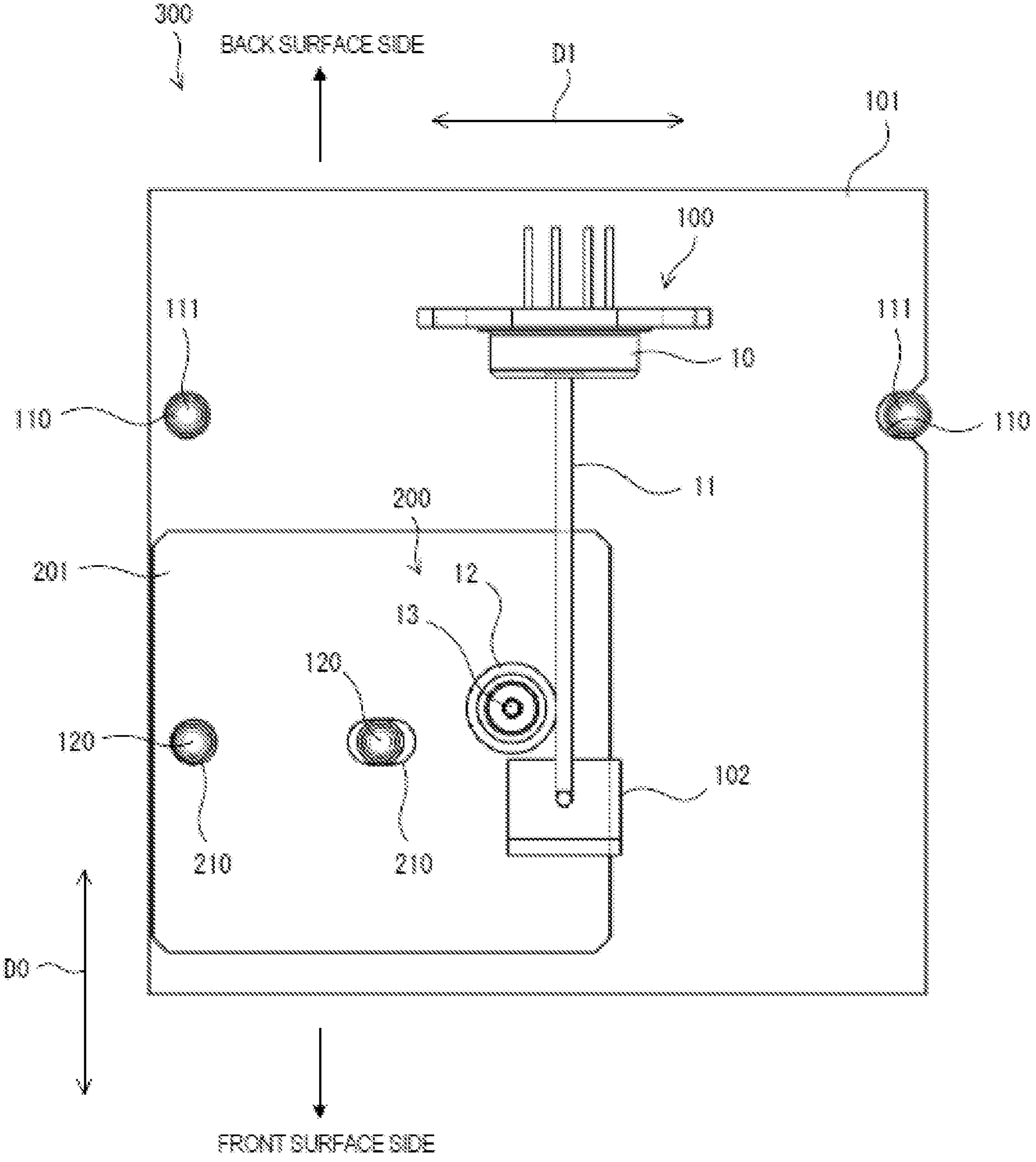
FIG. 2 is a plan view schematically illustrating a configuration example around a first laser light source and a second laser light source.

FIG. 2 is a plan view schematically illustrating a configuration example around the first laser light source 10 and the second laser light source 12. In this example, the first laser light source 10 includes a laser oscillator. On the other hand, the second laser light source 12 includes an emission tube provided at a tip of an optical fiber that guides laser light from a laser oscillator (not illustrated). As described above, the first laser light source 10 and the second laser light source 12 can be constituted by an optional member that emits laser light. Note that, in FIG. 2, a part of members is omitted from illustration.

The first laser light source 10 is attached to a first base member 101. By the above, a first laser module 100 including the first laser light source 10 and the first base member 101 is configured. The first laser module 100 also includes a mirror 102 (not illustrated in FIG. 1) attached to the first base member 101. The first laser light source 10 and the mirror 102 are an example of an optical member included in the first laser module 100.

The first laser light 11 emitted from the first laser light source 10 is beam-shaped laser light traveling in a straight line toward the mirror 102. A traveling direction of the first laser light 11 incident on the mirror 102 is changed by being reflected by the mirror 102.

The second laser light source 12 is attached to a second base member 201. By the above, a second laser module 200 including the second laser light source 12 and the second base member 201 is configured. The second laser light source 12 is an example of an optical member included in the second laser module 200. The second laser light 13 emitted from the second laser light source 12 is beam-shaped laser light traveling in a straight line and travels in parallel with the first laser light 11 reflected by the mirror 102.

Each of the first base member 101 and the second base member 201 is constituted by a plate-like member. The second base member 201 is smaller than the first base member 101, and is fixed in a state of abutting on the first base member 101. By the above, the first laser module 100 and the second laser module 200 are connected, and a laser unit 300 in which relative positions of the laser modules 100 and 200 are fixed is configured.

The laser unit 300 is attached to an attachment position of the Raman spectrometer 1 in a state where the first base member 101 and the second base member 201 are integrally connected. A frame 500 (see FIG. 3A) is provided in the Raman spectrometer 1, and the laser unit 300 is attached to an attachment position on the frame 500.

On the first base member 101, a positioning portion 110 for positioning the laser unit 300 on the frame 500 is formed. The positioning portion 110 includes, for example, a hole or a notch, and is positioned by being engaged with an engagement portion 111 such as a pin formed in the frame 500. In this example, two of the positioning portions 110 are provided, but the number of the positioning portions 110 may be one or three or more. In a state in which the laser unit 300 is positioned on the frame 500, displacement of the laser unit 300 in a horizontal direction (a front-back direction D0 and a lateral direction D1) is restricted, so that displacement of optical axes of the first laser light 11 and the second laser light 13 emitted from the laser unit 300 is prevented.

3. Configuration of First Laser Module

Figure 3A:
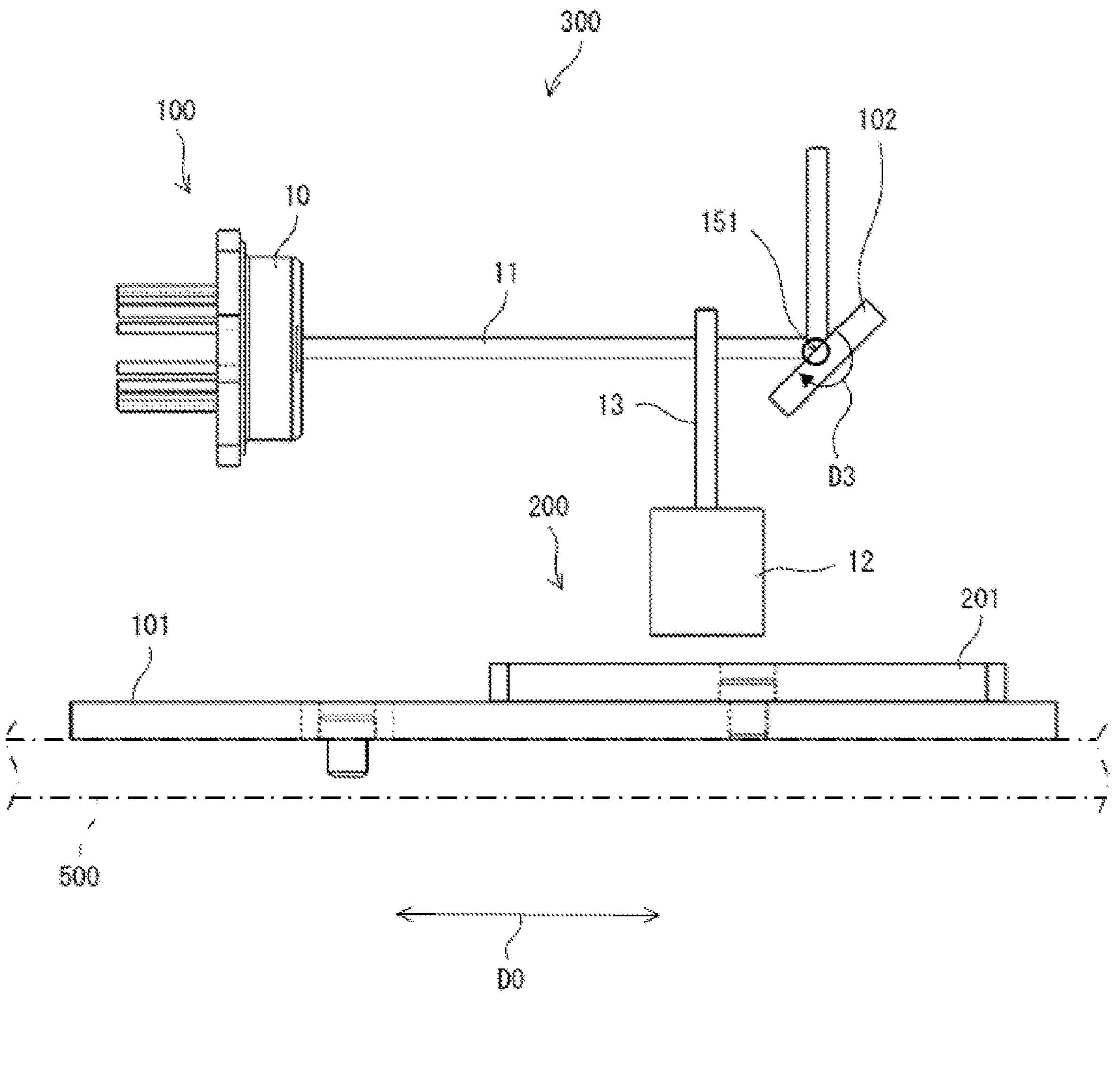
FIG. 3A is a diagram illustrating a configuration example of a first laser module.
Figure 3B:
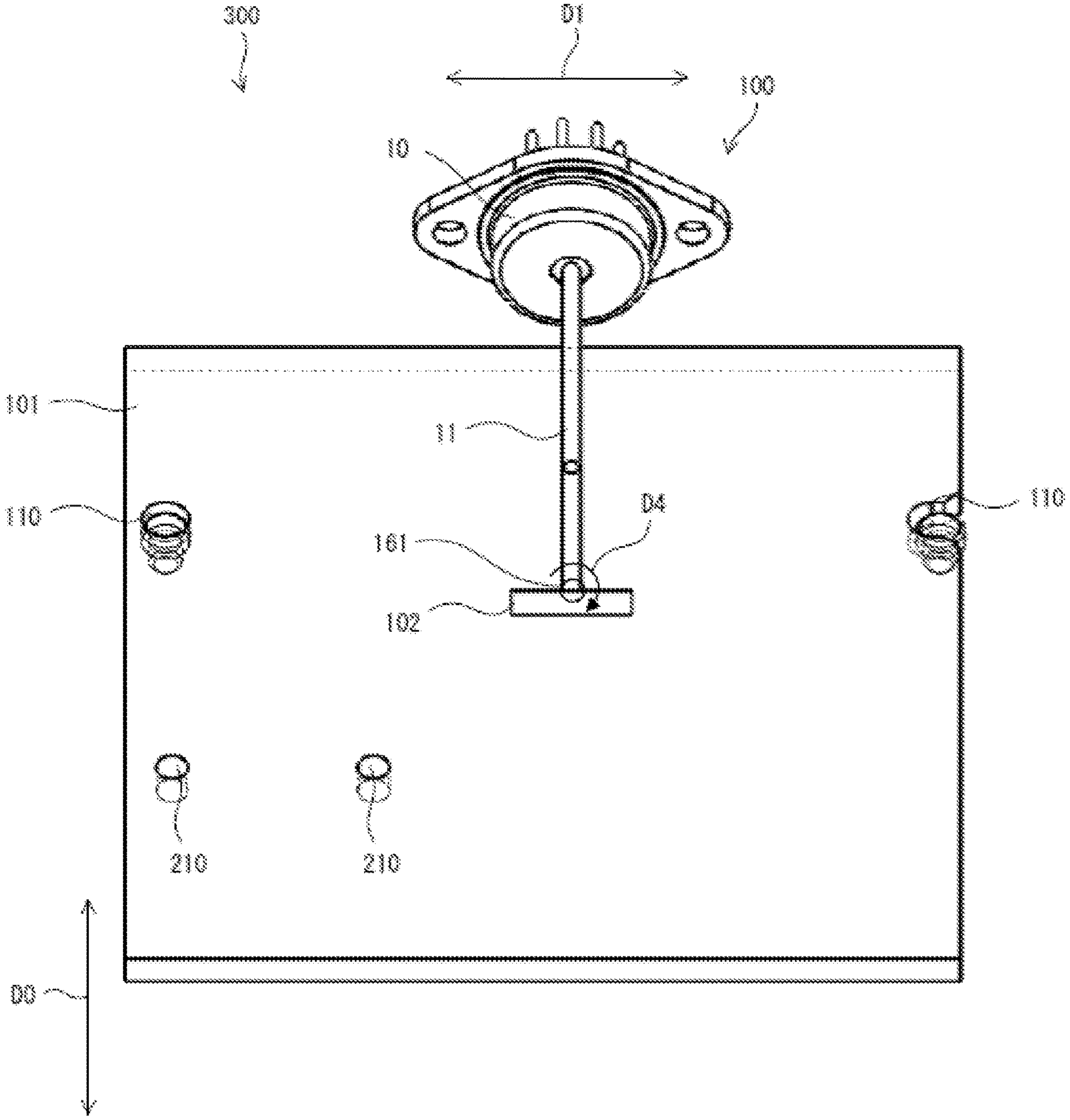
FIG. 3B is a diagram illustrating a configuration example of the first laser module.

FIGS. 3A and 3B are diagrams illustrating a configuration example of the first laser module 100. FIG. 3A is a side view of the first laser module 100, and FIG. 3B is a perspective view of the first laser module 100 as viewed from the front side. Note that, in FIGS. 3A and 3B, a part of members is omitted from illustration.

As illustrated in FIG. 3A, the mirror 102 is rotatable in a first direction D3 about an axis 151 extending along the lateral direction D1.

After a rotation position in the first direction D3 of the mirror 102 is adjusted by rotation of the mirror 102 about the axis 151 as described above, one or a plurality of screws (not illustrated) as a fixing tool are fastened, so that the mirror 102 can be fixed in the first direction D3.

As illustrated in FIG. 3B, the mirror 102 is rotatable in a second direction D4 about an axis 161 extending parallel to the mirror 102 and perpendicular to the lateral direction D1. The axis 161 intersects (for example, is orthogonal to) the axis 151.

After a rotation position in the second direction D4 of the mirror 102 is adjusted by rotation of the mirror 102 about the axis 161 as described above, one or a plurality of screws (not illustrated) as a fixing tool are fastened, so that the mirror 102 can be fixed in the second direction D4.

In the first laser module 100, two of the axes 151 and 161 and the like constitute an optical axis adjustment mechanism for adjusting an optical axis of the first laser light 11 emitted from the first laser module 100. However, the configuration may be such that the mirror 102 is rotatably supported around three or more axes without limitation to two of the axes 151 and 161.

As described above, a position or an angle of an optical axis of the first laser light 11 emitted from the first laser module 100 can be adjusted by the optical axis adjustment mechanism provided in the first laser module 100.

4. Configuration of Second Laser Module

Figure 4A:
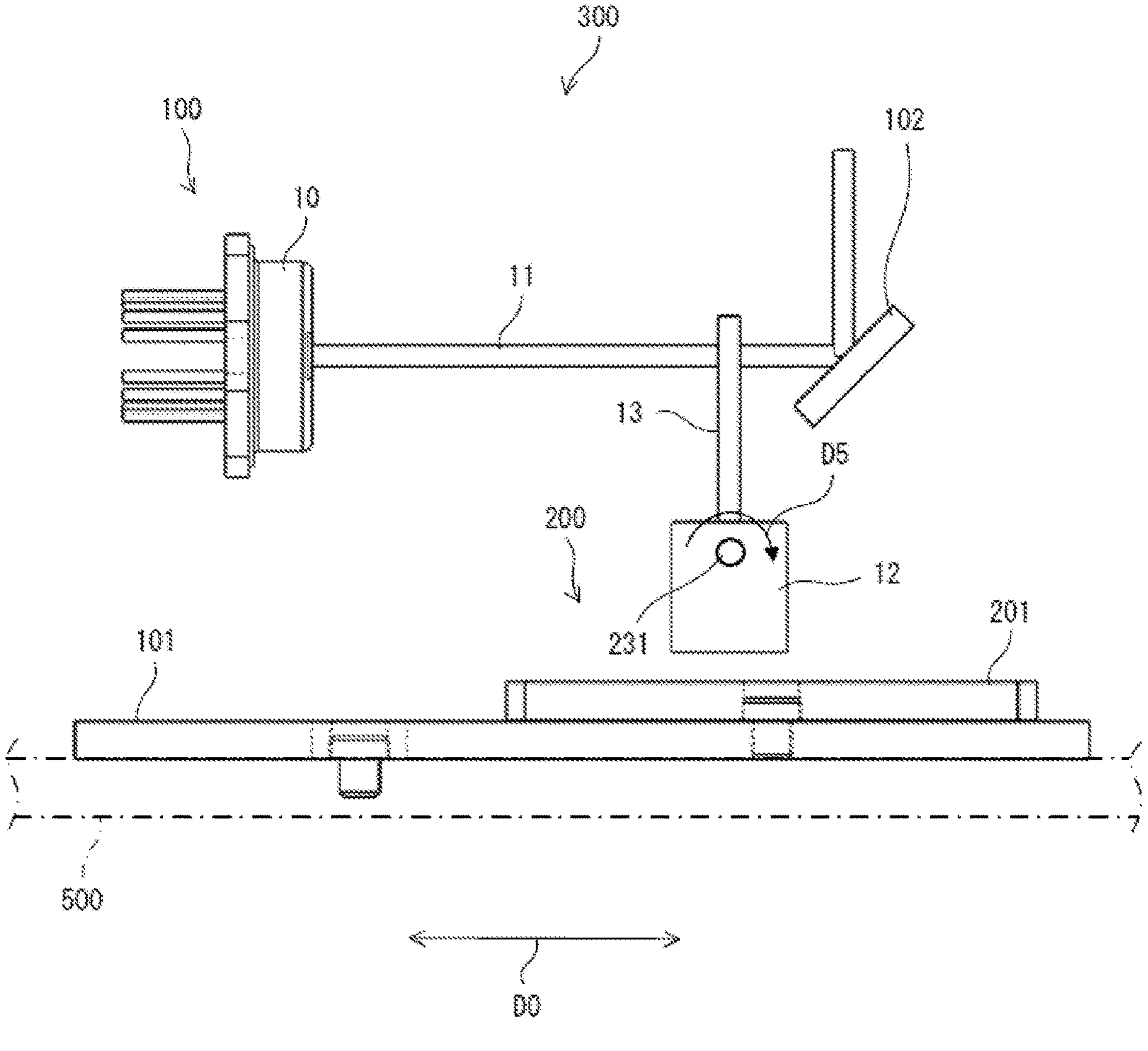
FIG. 4A is a diagram illustrating a configuration example of a second laser module.
Figure 4B:
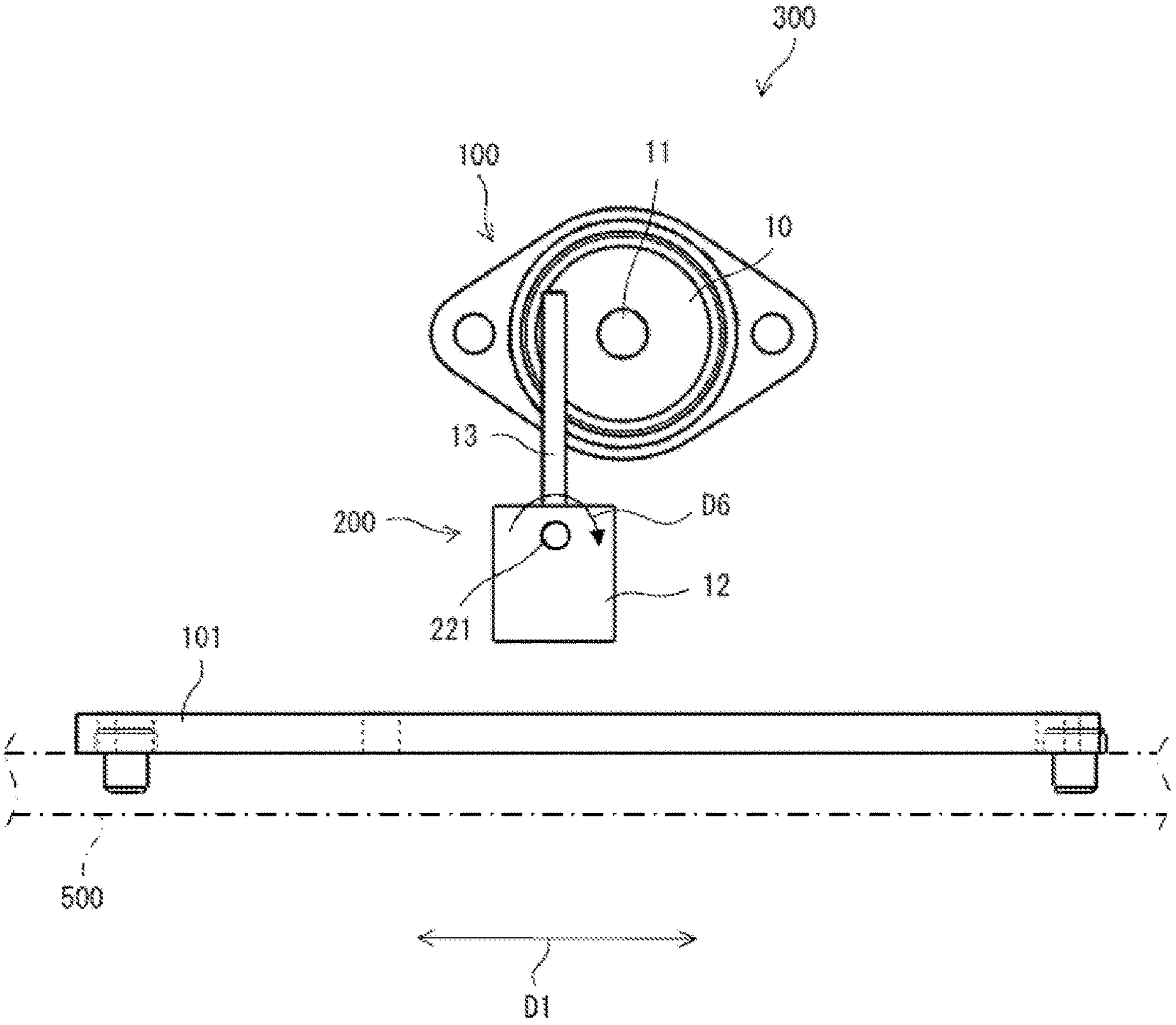
FIG. 4B is a diagram illustrating a configuration example of the second laser module.

FIGS. 4A and 4B are diagrams illustrating a configuration example of the second laser module 200. FIG. 4A is a side view of the second laser module 200, and FIG. 4B is a front view of the second laser module 200. Note that, in FIGS. 4A and 4B, a part of members is omitted from illustration.

As illustrated in FIG. 4A, the second laser light source 12 is rotatable in a first direction D5 about an axis 231 extending along the lateral direction D1.

After a rotation position in the first direction D5 of the second laser light source 12 is adjusted by rotation of the second laser light source 12 about the axis 231 as described above, one or a plurality of screws (not illustrated) as a fixing tool are fastened, so that the second laser light source 12 can be fixed in the first direction D5.

As illustrated in FIG. 4B, the second laser light source 12 is rotatable in a second direction D6 about an axis 221 extending along the front-back direction D0. The axis 221 intersects (for example, is orthogonal to) the axis 231.

After a rotation position in the second direction D6 of the second laser light source 12 is adjusted by rotation of the second laser light source 12 about the axis 221 as described above, one or a plurality of screws (not illustrated) as a fixing tool are fastened, so that the second laser light source 12 can be fixed in the second direction D6.

In the second laser module 200, two of the axes 221 and 231 and the like constitute an optical axis adjustment mechanism for adjusting an optical axis of the second laser light 13 emitted from the second laser module 200. However, the configuration may be such that the second laser light source 12 is rotatably supported around three or more axes without limitation to two of the axes 221 and 231.

As illustrated in FIG. 2, a positioning portion 210 for positioning the second laser module 200 on the first laser module 100 is formed in the second base member 201. The positioning portion 210 includes, for example, a hole or a notch, and is positioned by being engaged with an engagement portion 120 such as a pin formed in the first base member 101 of the first laser module 100. In this example, two of the positioning portions 210 are provided, but the number of the positioning portions 210 may be one or three or more. In a state where the second laser module 200 is positioned on the first laser module 100, displacement of the second laser module 200 in the horizontal direction (the front-back direction D0 and the lateral direction D1) is restricted, so that relative displacement between an optical axis of the first laser light 11 emitted from the first laser module 100 and an optical axis of the second laser light 13 emitted from the second laser module 200 is prevented.

5. Configuration of Optical Axis Adjustment Jig

Figure 5A:
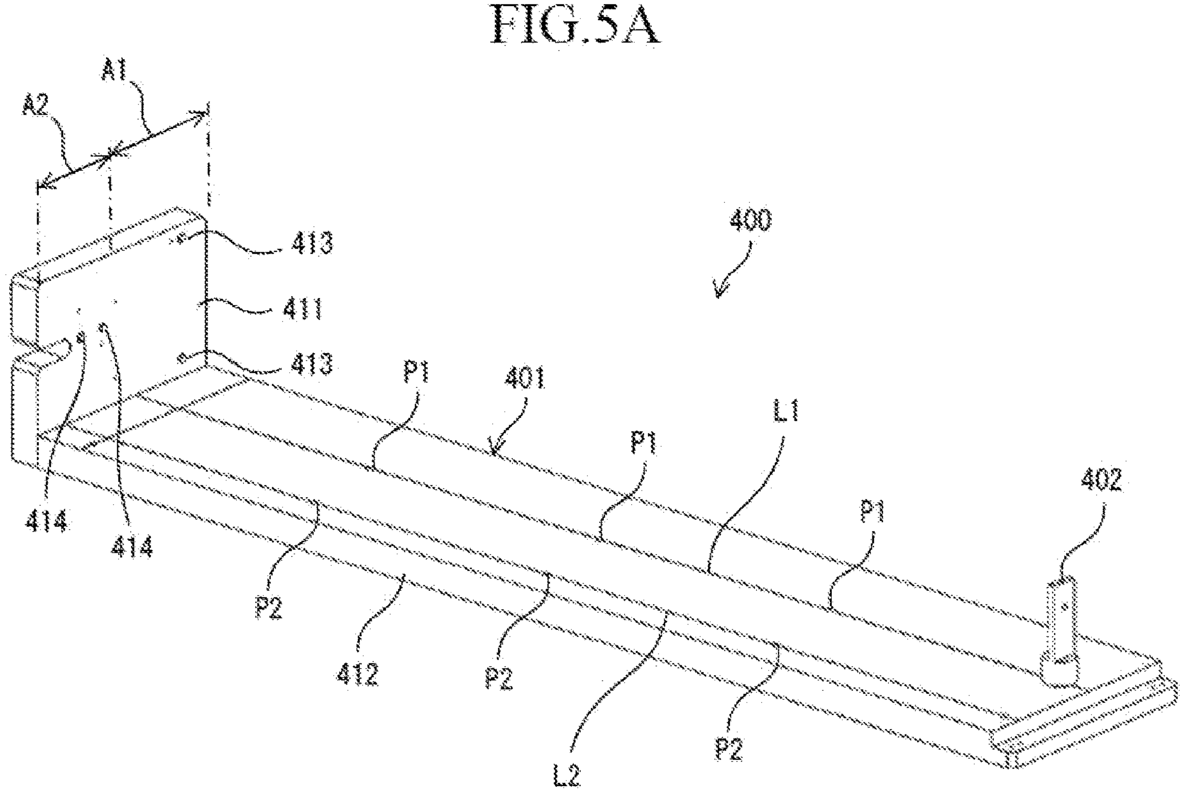
FIG. 5A is a perspective view illustrating a configuration example of an optical axis adjustment jig.
Figure 5B:
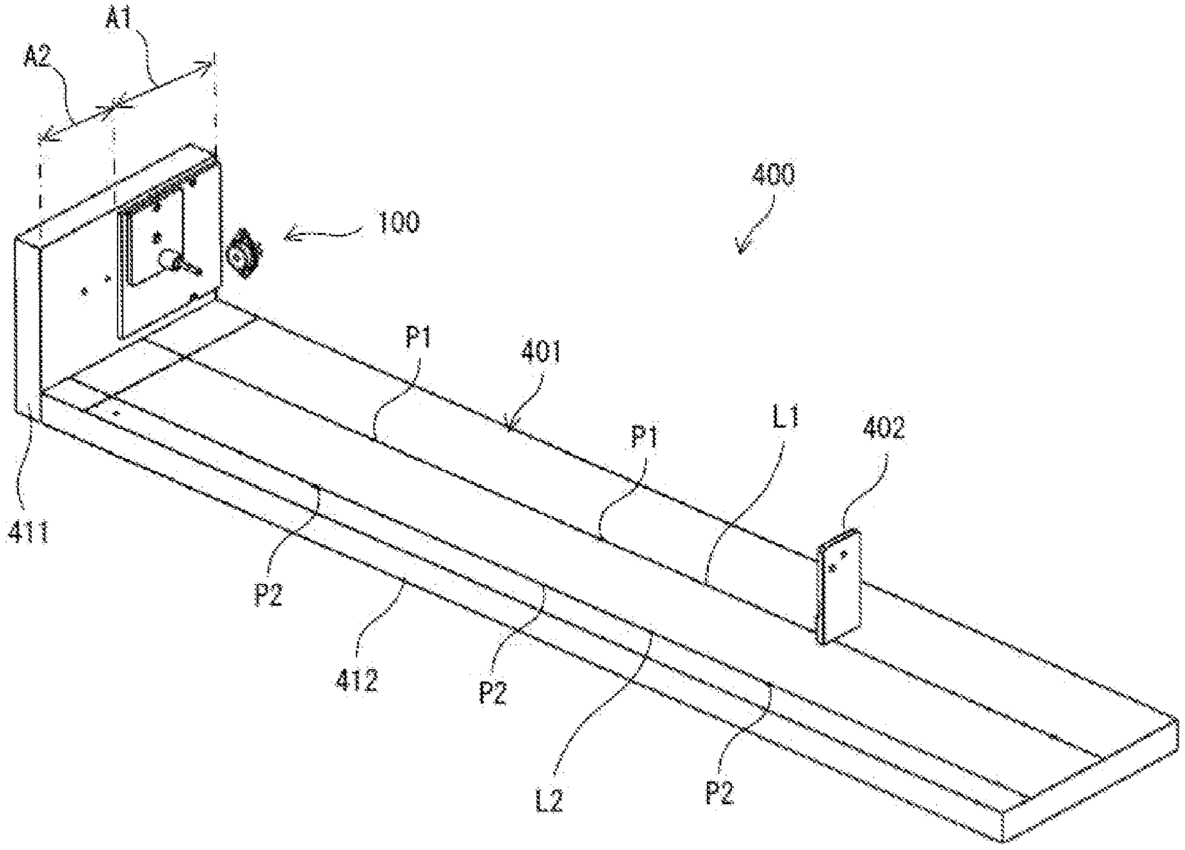
FIG. 5B is a perspective view illustrating a configuration example of the optical axis adjustment jig.

FIGS. 5A and 5B are a perspective view illustrating a configuration example of an optical axis adjustment jig 400. FIG. 5A illustrates a state in which the first laser module 100 and the second laser module 200 are not attached to the optical axis adjustment jig 400, and FIG. 5B illustrates a state in which the first laser module 100 is attached to the optical axis adjustment jig 400. Note that, in FIG. 5B, the second laser module 200 is omitted from illustration, and a part of members of the first laser module 100 is omitted from illustration.

In the present embodiment, in a state where the first laser module 100 and the second laser module 200 are detached from the Raman spectrometer 1, the laser modules 100 and 200 are mounted on the optical axis adjustment jig 400 (hereinafter, simply referred to as "jig 400"), and an optical axis of each of the laser modules 100 and 200 can be adjusted. That is, optical axis adjustment of each of the laser modules 100 and 200 can be performed outside the Raman spectrometer 1.

As illustrated in FIGS. 5A and 5B, the jig 400 includes an attachment member 401 and an irradiation unit 402. The attachment member 401 includes an attachment portion 411 on which the laser modules 100 and 200 are mounted, and an extension portion 412 extending along an optical axis of laser light from the laser modules 100 and 200 mounted on the attachment portion 411. The attachment portion 411 and the extension portion 412 are plate-like members, and are configured in an L shape by being connected to each other.

The first laser module 100 and the second laser module 200 can be separately attached to the attachment portion 411. That is, a first attachment region A1 to which the first laser module 100 is attached and a second attachment region A2 to which the second laser module 200 is attached are formed in the attachment portion 411.

In the first attachment region A1 of the attachment portion 411, an engagement portion 413 for engaging the positioning portion 110 formed in the first base member 101 of the first laser module 100 is provided. In this example, the engagement portion 413 is constituted by two pins protruding from the attachment portion 411. The engagement portions 413 are the same as the engagement portion 111 formed on the frame 500 of the Raman spectrometer 1 in order to engage the positioning portion 110 of the first base member 101. However, a shape and the number of the engagement portions 413 are optional as long as the configuration is such that the first laser module 100 can be positioned so as not to be displaced.

In the second attachment region A2 of the attachment portion 411, an engagement portion 414 for engaging the positioning portion 210 formed in the second base member 201 of the second laser module 200 is provided. In this example, the engagement portion 414 is constituted by two pins protruding from the attachment portion 411. The engagement portions 414 are the same as the engagement portions 120 formed on the first base member 101 of the first laser module 100 in order to engage the positioning portion 210 of the second base member 201. However, a shape and the number of the engagement portions 414 are optional as long as the configuration is such that the second laser module 200 can be positioned so as not to be displaced.

The first laser light 11 emitted from the first laser module 100 mounted on the attachment portion 411 travels in parallel with the extension portion 412. At this time, the first laser light 11 travels in a straight line above a first line L1 of the extension portion 412, and is applied to the irradiation unit 402 provided on the first line L1.

Therefore, by adjustment of an optical axis of the first laser light 11 using the optical axis adjustment mechanism of the first laser module 100, an irradiation position of the first laser light 11 in the irradiation unit 402 can be made to coincide with an appropriate position. The irradiation unit 402 may be provided with a mark indicating an appropriate irradiation position.

The irradiation unit 402 is attachable to and detachable from a plurality of different positions in the extension portion 412. In FIGS. 5A and 5B, the irradiation unit 402 is attached to an optical path of the first laser light 11 emitted from the first laser module 100, but the irradiation unit 402 may be attached to an optical path of the second laser light 13 emitted from the second laser module 200. In this case, the second laser light 13 emitted from the second laser module 200 mounted on the attachment portion 411 travels in a straight line above a second line L2 of the extension portion 412, and is applied to the irradiation unit 402 provided on the second line L2. The second line L2 is parallel with the first line L1.

Therefore, by adjustment of an optical axis of the second laser light 13 using the optical axis adjustment mechanism of the second laser module 200, an irradiation position of the second laser light 13 in the irradiation unit 402 can be made to coincide with an appropriate position.

Further, in the present embodiment, a plurality of attachment positions P1 of the irradiation unit 402 are provided on the first line L1 of the extension portion 412. That is, the irradiation unit 402 is attachable to and detachable from a plurality of the attachment positions P1 different from each other in an optical axis direction of the first laser light 11 from the first laser module 100 attached to the attachment portion 411. As the attachment position P1 of the irradiation unit 402 on the first line L1 is changed, an optical path length of the first laser light 11 from the first laser module 100 to the irradiation unit 402 can be changed.

Similarly, a plurality of attachment positions P2 of the irradiation unit 402 are provided on the second line L2 of the extension portion 412. That is, the irradiation unit 402 is attachable to and detachable from a plurality of the attachment positions P2 different from each other in an optical axis direction of the second laser light 13 from the second laser module 200 attached to the attachment portion 411. As the attachment position P2 of the irradiation unit 402 on the second line L2 is changed, an optical path length of the second laser light 13 from the second laser module 200 to the irradiation unit 402 can be changed.

However, the configuration may be such that the irradiation unit 402 is slidable on the first line L1 or the second line L2 without limitation to the configuration in which the irradiation unit 402 is attachable to and detachable from a plurality of the attachment positions P1 and P2. That is, the configuration may be such that the irradiation unit 402 is movable to a plurality of different positions in an optical axis direction of the laser light 11 and 13 as the irradiation unit 402 is attached and detached or slid. Further, the irradiation unit 402 may be provided on both the first line L1 and the second line L2.

6. Optical Axis Adjustment Method

Figure 6:
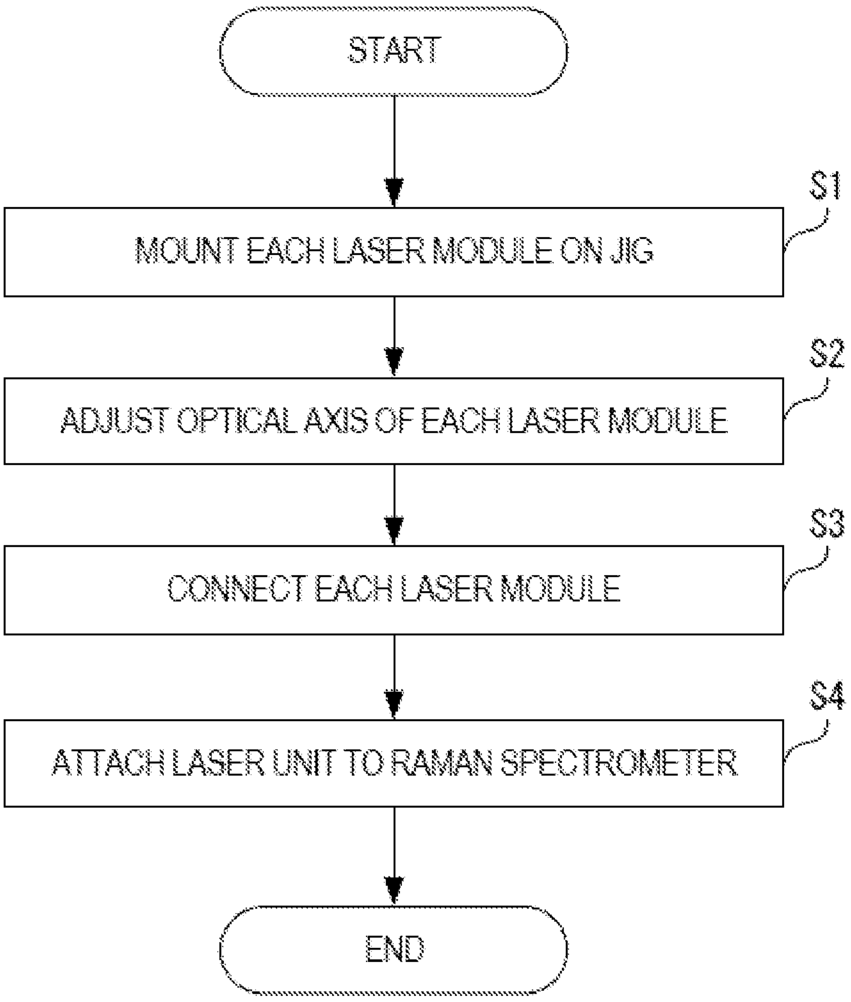
FIG. 6 is a flowchart for explaining an optical axis adjustment method for a laser module.

FIG. 6 is a flowchart for explaining an optical axis adjustment method of the laser modules 100 and 200. In this example, a method of adjusting an optical axis of two laser modules (the first laser module 100 and the second laser module 200) will be described.

When optical axis adjustment is performed, first, the first laser module 100 and the second laser module 200 in a state of being detached from the Raman spectrometer 1 are mounted on the jig 400 (Step S1: jig mounting step). For example, when optical axis adjustment needs to be performed, such as when the first laser light source 10 and the second laser light source 12 in the Raman spectrometer 1 are maintained or replaced, or when the Raman spectrometer 1 as a brand-new product is assembled, the first laser module 100 and the second laser module 200 are mounted on the jig 400.

After the above, optical axis adjustment of the first laser module 100 and the second laser module 200 is performed using the jig 400 (Step S2: optical axis adjusting step). That is, while the first laser light 11 is emitted from the first laser module 100, a position and an angle of an optical axis of the first laser light 11 are adjusted using an optical axis adjustment mechanism of the first laser module 100. Further, while the second laser light 13 is emitted from the second laser module 200, a position and an angle of an optical axis of the second laser light 13 are adjusted using an optical axis adjustment mechanism of the second laser module 200.

As described above, in the present embodiment, two laser modules (the first laser module 100 and the second laser module 200) are mounted on the jig 400, and optical axes of the laser light 11 and 13 emitted from the laser modules 100 and 200 can be adjusted.

The first laser module 100 and the second laser module 200 whose optical axes have been adjusted are connected to each other to constitute the integrated laser unit 300 (Step S3: connecting step). By the above, since relative positions of the first laser module 100 and the second laser module 200 are fixed, optical axes of the first laser light 11 and the second laser light 13 are not relatively displaced.

The laser unit 300 whose optical axis has been adjusted is attached to a predetermined position of the frame 500, which is an attachment position of the Raman spectrometer 1 (Step S4: device attaching step). By the above, the first laser module 100 and the second laser module 200 can be integrally attached to the Raman spectrometer 1.

However, the optical axis adjustment method may be such that an optical axis of one or three or more laser modules, instead of two laser modules (the first laser module 100 and the second laser module 200), is adjusted and then the laser module is attached to the Raman spectrometer 1. In a case where there are three or more laser modules, all the laser modules are preferably connected after optical axis adjustment to constitute an integrated laser unit. On the other hand, when there is one laser module, Step S3 in FIG. 6 may be omitted.

7. Aspect

It is understood by those skilled in the art that a plurality of the exemplary embodiments described above are specific examples of an aspect below.

(Clause 1) An optical axis adjustment method for a laser module according to one aspect is an optical axis adjustment method for a laser module used in a Raman spectrometer, and may include:

a jig mounting step of mounting the laser module having an optical axis adjustment mechanism on an optical axis adjustment jig in a state where the laser module is detached from the Raman spectrometer;

an optical axis adjusting step of adjusting an optical axis of the laser module by using the optical axis adjustment mechanism of the laser module mounted on the optical axis adjustment jig: and a device attaching step of attaching the laser module whose optical axis has been adjusted in the optical axis adjusting step to an attachment position of the Raman spectrometer.

According to the optical axis adjustment method according to Clause 1, the laser module can be mounted on the optical axis adjustment jig outside the Raman spectrometer, an optical axis can be adjusted using the optical axis adjustment mechanism of the laser module, and then the laser module can be attached to the attachment position of the Raman spectrometer. For this reason, optical axis adjustment for laser light in the Raman spectrometer becomes unnecessary.

(Clause 2) In the optical axis adjustment method for a laser module according to Clause 1, the optical axis adjustment method may further include:

a connecting step of connecting a plurality of the laser modules whose optical axes have been adjusted in the optical axis adjusting step to constitute a laser unit in which relative positions of the plurality of laser modules are fixed, and in the device attaching step, the laser unit may be attached to the attachment position of the Raman spectrometer.

According to the optical axis adjustment method according to Clause 2, after an optical axis of a plurality of laser modules is adjusted outside the Raman spectrometer, a plurality of these laser modules can be connected to constitute an integrated laser unit, and the laser unit can be attached to the attachment position of the Raman spectrometer. For this reason, each optical axis of laser light emitted from each laser module is not relatively displaced.

(Clause 3) In the optical axis adjustment method for a laser module according to Clause 2, in the jig mounting step, the plurality of laser modules may be mounted on the optical axis adjustment jig, and in the optical axis adjusting step, an optical axis of each of the plurality of laser modules may be adjusted using the optical axis adjustment mechanism of the plurality of laser modules attached to the optical axis adjustment jig.

According to the optical axis adjustment method according to Clause 3, a plurality of laser modules can be mounted on the optical axis adjustment jig, and each optical axis of laser light emitted from each laser module can be adjusted at once. Further, since an optical axis of a plurality of laser modules is adjusted using the same optical axis adjustment jig, each optical axis of laser light emitted from each laser module is not relatively displaced based on an individual difference of the optical axis adjustment jig.

(Clause 4) An optical axis adjustment jig according to one aspect is an optical axis adjustment jig used in the optical axis adjustment method for a laser module according to any one of Clauses 1 to 3, and may include:

an attachment member on which the laser module is mounted; and an irradiation unit that is irradiated with laser light from the laser module mounted on the attachment member.

According to the optical axis adjustment jig according to Clause 4, the irradiation unit can be irradiated with laser light from the laser module attached to the attachment member, and an irradiation position of laser light in the irradiation unit can be adjusted to an appropriate position, so that an optical axis of the laser light can be suitably adjusted.

(Clause 5) In the optical axis adjustment jig according to Clause 4, the irradiation unit may be movable to a plurality of different positions in an optical axis direction of the laser light from the laser module mounted on the attachment member.

According to the optical axis adjustment jig according to Clause 5, an optical path length of laser light from the laser module to the irradiation unit can be changed by movement of a position of the irradiation unit in an optical axis direction of the laser light. As described above, by performing optical axis adjustment while changing an optical path length of laser light, displacement of an angle of laser light can be suitably adjusted.

DESCRIPTION OF REFERENCE SIGNS

1 Raman spectrometer
10 first laser light source
11 first laser light
12 second laser light source
13 second laser light
100 first laser module
101 first base member
102 mirror
151, 161, 221, 231 axis
200 second laser module
201 second base member
300 laser unit
400 optical axis adjustment jig
401 attachment member
402 irradiation unit
411 attachment portion
412 extension portion

The invention claimed is:

1. An optical axis adjustment method for a laser module used in a Raman spectrometer, the optical axis adjustment method comprising:

a jig mounting step of mounting the laser module having an optical axis adjustment mechanism on an optical axis adjustment jig in a state where the laser module is detached from the Raman spectrometer;

an optical axis adjusting step of adjusting an optical axis of the laser module by using the optical axis adjustment mechanism of the laser module mounted on the optical axis adjustment jig; and a device attaching step of attaching the laser module whose optical axis has been adjusted in the optical axis adjusting step to an attachment position of the Raman spectrometer, and a connecting step of connecting a plurality of the laser modules whose optical axes have been adjusted in the optical axis adjusting step to constitute a laser unit in which relative positions of the plurality of laser modules are fixed, wherein in the device attaching step, the laser unit is attached to the attachment position of the Raman spectrometer.

2. The optical axis adjustment method for a laser module according to claim 1, wherein in the jig mounting step, the plurality of laser modules are mounted on the optical axis adjustment jig, and in the optical axis adjusting step, an optical axis of each of the plurality of laser modules is adjusted using the optical axis adjustment mechanism of the plurality of laser modules mounted on the optical axis adjustment jig.

3. An optical axis adjustment jig used in the optical axis adjustment method for a laser module according to claim 1, the optical axis adjustment jig comprising:

an attachment member on which the laser module is mounted; and an irradiation unit that is irradiated with laser light from the laser module mounted on the attachment member.

4. The optical axis adjustment jig according to claim 3, wherein the irradiation unit is movable to a plurality of different positions in an optical axis direction of the laser light from the laser module mounted on the attachment member.

* * * * *